Sept. 26, 1961       P. B. DAY       3,001,448
TORIC SURFACE FOR THE ASTIGMATIC CORRECTION OF
A SHALLOW DOME AND PRISM COMBINATION
Filed July 24, 1956                3 Sheets-Sheet 1
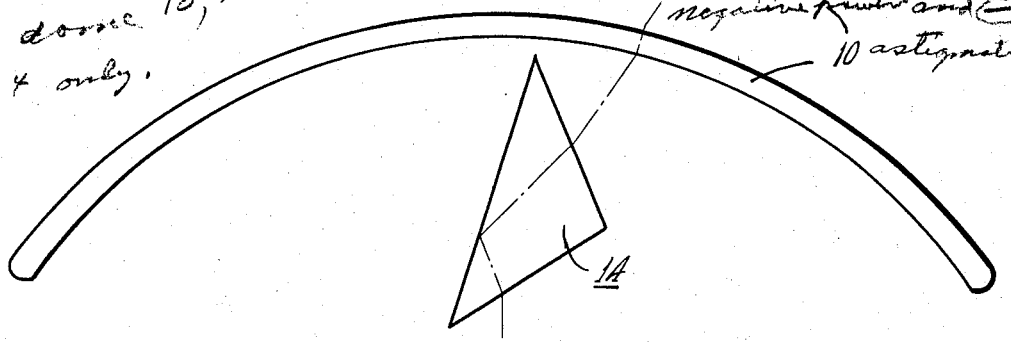
Fig. 1
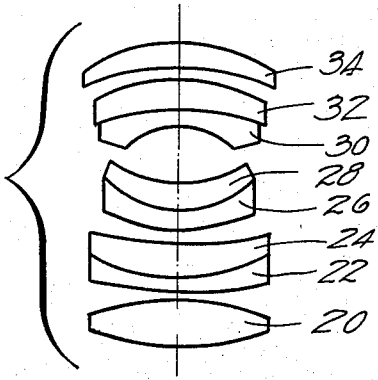
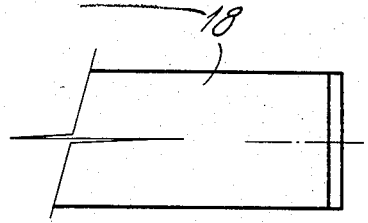
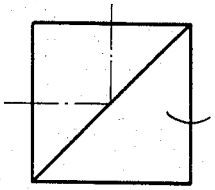
INVENTOR.
PIERCE B. DAY
BY Arthur L. Collins
ATTORNEY

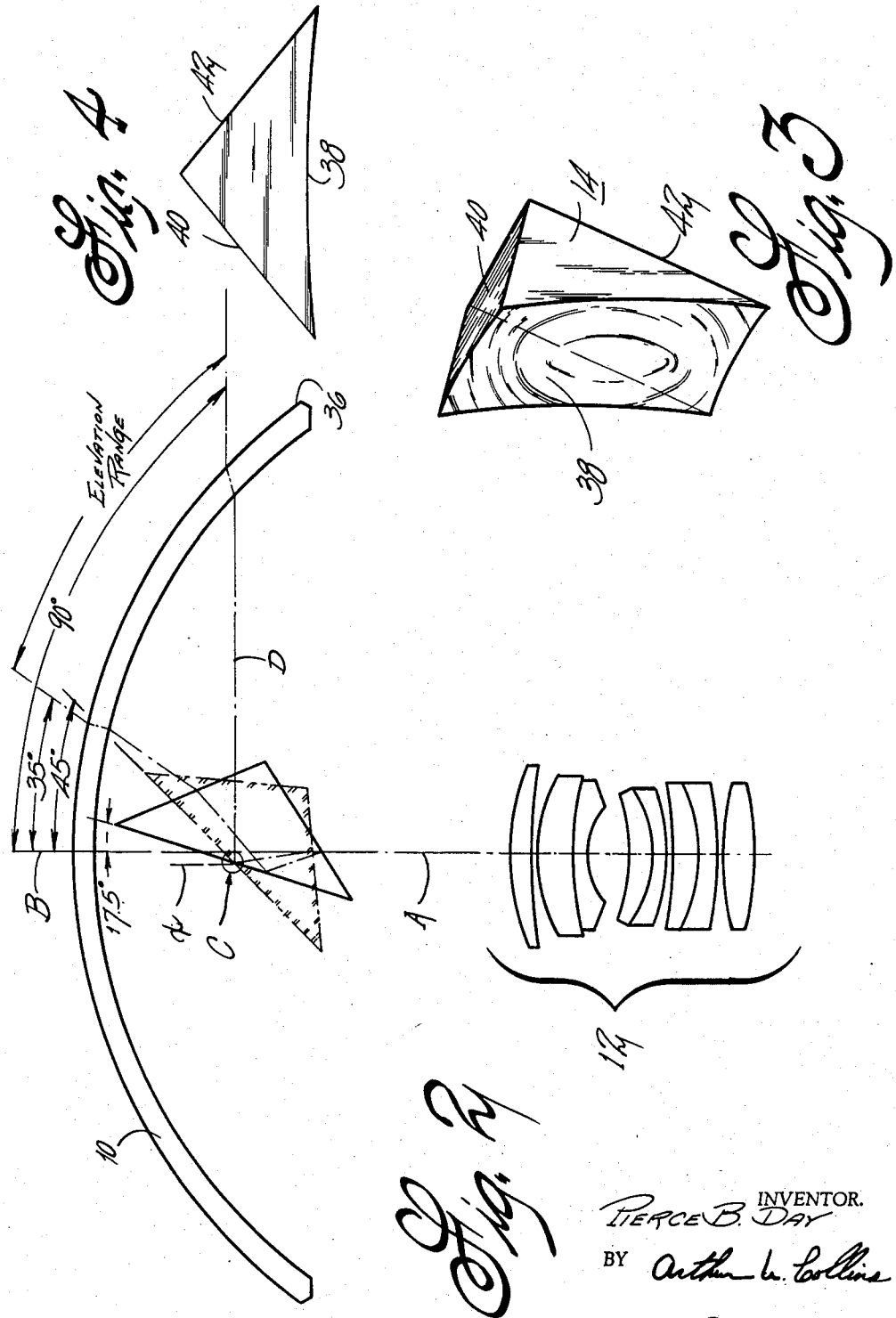

Sept. 26, 1961 P. B. DAY 3,001,448
TORIC SURFACE FOR THE ASTIGMATIC CORRECTION OF
A SHALLOW DOME AND PRISM COMBINATION
Filed July 24, 1958 3 Sheets-Sheet 3
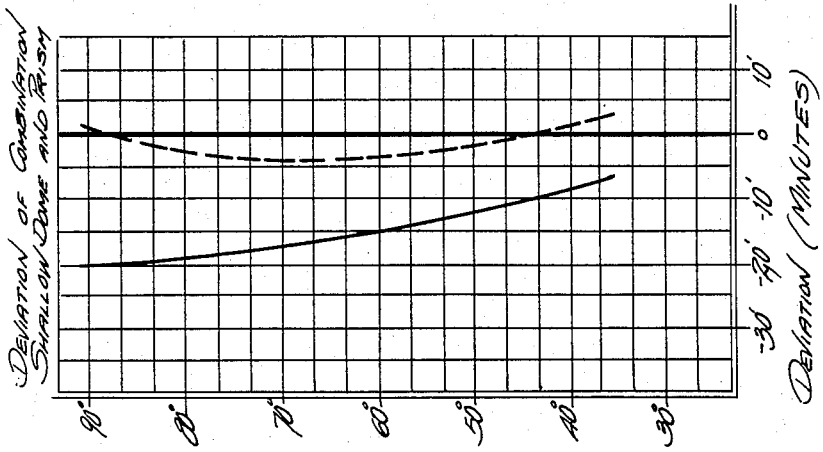
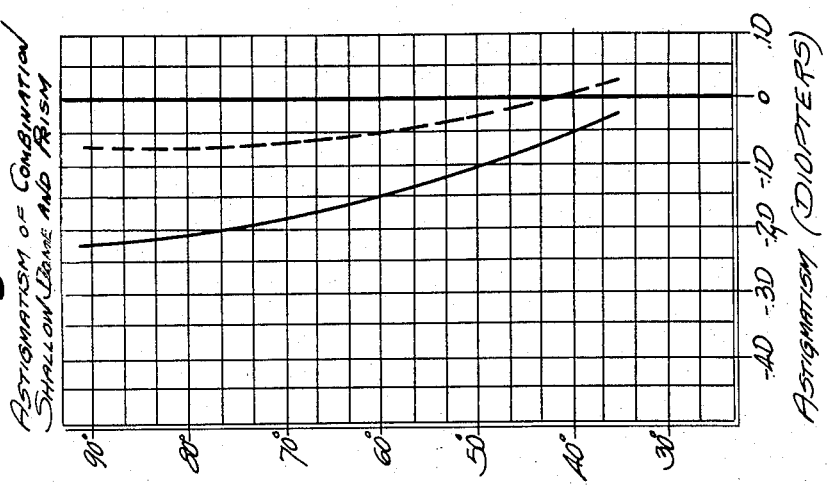
INVENTOR.
PIERCE B. DAY
BY Arthur L. Collins
ATTORNEY

United States Patent Office 3,001,448
Patented Sept. 26, 1961

---

3,001,448
TORIC SURFACE FOR THE ASTIGMATIC CORRECTION OF A SHALLOW DOME AND PRISM COMBINATION
Pierce B. Day, Rochester, N.Y., assignor, by mesne assignments, to the United States of America as represented by the Secretary of the Navy
Filed July 24, 1958, Ser. No. 751,599
5 Claims. (Cl. 88—72)

This invention relates to astigmatic corrections for optical systems and more particularly to an astigmatic corrections means for a combination shallow dome and scanning prism.

In optical systems including a high aperture lens in combination with a shallow dome and scanning prism, the power as well as the astigmatism contribution of both the dome and the scanning prism must be controlled within close tolerances. Inasmuch as a shallow dome functions as a thin negative lens, a beam of light passing therethrough will be diverged parallel and symmetrical to its optical axis. This divergence or deviation (power) of the light beam will result in the introduction of negative astigmatism into the optical system which will progressively increase for certain elevation angles measured from the dome axis. The surfaces of the scanning prism will also contribute power and a resultant astigmatism to the optical system and the rotation thereof will introduce astigmatism proportional to the tilt of the prism surfaces with respect to the optical axis. If the astigmatic contributions of the dome and prism are both negative, the astigmatism will be compounded and thus require correction.

The astigmatic correction contemplated by the present invention resides in a means for introducing positive astigmatism into the optical system to compensate for the negative astigmatism produced by the shallow dome. In the preferred embodiment of the invention, positive astigmatism is introduced into the system over selected elevation angles by utilizing a scanning prism having a toric or concave surface on one face thereof. The prism is mounted for rotation about a fixed axis spaced at a predetermined distance from the dome and upon rotation introduces positive astigmatism in progressively increasing amounts over selected angles of the elevation range.

Accordingly, one object of the present invention is to provide an astigmatic correction means in a combination shallow dome and prism.

Another object of the invention is to control the astigmatism in a combination shallow dome and prism over selected elevation angles measured from the dome axis.

Another object of the invention is to compensate for the deviation introduced into an optical system by a shallow dome.

These and other objects of the present invention will become readily apparent from the following detailed description of a preferred embodiment thereof taken in connection with the following drawings wherein:

FIG. 1 is a schematic illustration of a bombsight optical system including a high aperture lens and a combination shallow dome and scanning prism;

FIG. 2 is a schematic illustration of a portion of the optical system of FIGURE 1 showing the optical axis and elevation angles of the combination dome and prism;

FIG. 3 is a perspective view of the scanning prism;

FIG. 4 is a side elevation of the scanning prism;

FIG. 5 is a graph showing the results afforded by the astigmatic correction means of the present invention; and FIG. 6 is another graph showing the results afforded by the astigmatic correction means of the present invention.

Referring more particularly to the drawings, FIG. 1 shows an optical system utilized in a television-type bombsight including a shallow transparent dome 10 for admitting light, a composite high aperture lens 12 comprised of a series of positive and negative lenses and a scanning prism 14 positioned between the dome 10 and composite lens 12 with the scanning prism intersecting the optical axis A of the composite lens. Light passing through the lens 12 is adapted to strike a beam splitter 16 from where it is reflected to a vidicon tube 18. The composite lens 12 includes a positive lens 20, a negative lens 22, a positive lens 24, a negative lens 26, a positive lens 28, a negative lens 30, a positive lens 32 and positive lens 34.

Referring to FIG. 2, it can be seen that the dome 10 is positioned such that the geometrical center or axis B thereof coincides with the optical axis A of the composite lens 12. Dome 10 is constructed such that the thickness thereof progressively increases from the geometrical axis B toward its outer rim or periphery 36. In this particular instance, the inner peripheral surface of the dome has a radius of curvature of 152.5 mm. while the outer peripheral surface is defined by a radius of curvature of 158.75 mm.

The scanning prism 14 is mounted for rotation about an axis C which is substantially normal to the axes A and B and slightly offset therefrom by a distance $x$, distance $x$ in this preferred embodiment of the invention being 2.79 mm. Axis of rotation C is also spaced from the undersurface of the dome in this instance by a distance of 41.28 mm.

As best seen in FIGS. 3 and 4, the scanning prism 14 is substantially triangular-shaped with the hypotenuse face 38 of the prism being dished or concave. In this particular embodiment of the prism, the concavity of the hypotenuse face 38 is defined by a longitudinal radius of curvature of 40,000 mm. and a transverse radius of curvature of 8500 mm. Dimensionally, the hypotenuse face 38 of the prism 14 has a length of 80.818 mm. while the opposing faces 40 and 42 thereof have a length of 57.15 mm. The prism 14 may be made of any material suitable for prism use in optical systems although in this preferred embodiment is made of EDF–2 glass having an index of refraction of 1.689.

Referring again to FIG. 2, because there is a two to one relationship between the angular deviation of the optical axis D and the angular rotation of the scanning prism 14, the angle between the prism hypotenuse 38 and the dome axis B will range from approximately 17.5° to 45° for elevation angles of 35° to 90°, where the elevation angles as shown are measured from the dome axis B to the optical axis D in the space outside the dome 10. In the absence of the dome 10, there would be an exact two to one relationship between the elevation angles and the angular rotations of the prism 14. This is not true, however, when the dome 10 is utilized inasmuch as the optical axis D is deviated by the dome, the deviation being a function of the elevation angles. It can readily be seen therefore that the deviation introduced by the dome 10 will result in a deviation error.

Inasmuch as the shallow dome 10 functions as a thin negative lens, it will diverge a beam of light parallel and symmetrical to its optical axis. Because of this divergence, the dome 10 will have a predetermined power which in optical units of measurement can be measured or computed in diopters. Since the tangential power of a shallow dome is greater than sagittal power thereof, the astigmatism introduced by a shallow dome will be negative. In the preferred embodiment of the present invention, the astigmatism of dome 10 has been computed to be −0.011 diopters for an elevation angle of 35° and −0.173 diopters at an elevation angle of 90°.

To negative the astigmatic contribution of the dome 10, the scanning prism 14 must therefore introduce positive astigmatism increasing ideally from +0.011 diopters to +0.173 diopters over the elevation range of 35°–90°. Considering only the hypotenuse face or surface 38 of the prism, it will be apparent that its tilt with respect to optical axis D decreases with increasing elevation angles. To get astigmatism increasing in the postive sense, therefore, the surface 38 must contribute negative astigmatism for small elevation angles and the negative astigmatism must become less negative as the elevation angle increases. It is for this reason that the hypotenuse face 38 of the prism 14 is concave or toric.

FIGS. 5 and 6 show a graphical analysis of the astigmatism and deviation of a combination shallow dome and prism. It will be noted that the two graphs include a plot of both the compensated and uncompensated values of astigmatism and deviation over the elevation range. The broken line curve in each instance shows a plot of the compensated values of astigmatism and deviation computed for the preferred embodiment of the combination shallow dome and prism.

Obviously many modifications and variations of the present invention are possible in the light of the above teachings. It is therefore to be understood that within the scope of the appended claims the invention may be practiced otherwise than as specifically described.

What is claimed is:

1. In an optical system for a bombsight or the like including a composite high aperture lens having a predetermined optical axis, a shallow transparent dome covering said composite lens and having a geometrical center coinciding with the optical axis of said composite lens, the inner peripheral surface of said shallow dome having one predetermined radius of curvature and the outer peripheral surface of said dome having another predetermined radius of curvature, and a substantially triangular-shaped scanning prism positioned between said dome and said composite lens in the optical path of said composite lens, said scanning prism being rotatable about a fixed axis between a plurality of scanning positions with the hypotenuse face of said prism serving as a reflecting surface, said fixed axis of rotation of said scanning prism being spaced a first predetremined distance fom the inner peripheral surface of said dome and being offset a second predetermined distance from said optical axis of said composite lens which is about one-fifteenth that of said first predetermined distance, said hypotenuse face of said scanning prism having a predetermined concavity defined by a predetermined longitudinal radius of curvature and a predetermined transverse radius of curvature, said predetermined position of said scanning prism together with said predetermined concavity of said hypotenuse face thereof being operable to compensate for the astigmatism contribution and deviation error of said dome over a predetermined range of movement of said scanning prism.

2. In an optical system as claimed in claim 1 wherein said shallow dome has an outer peripheral surface having a radius of curvature of 158.75 mm. and has an inner peripheral surface having a radius of curvature of 152.5 mm.

3. In an optical system as claimed in claim 2 wherein said axis of rotation of said scanning prism is spaced from the inner peripheral surface of said dome by a distance of 41.28 mm. and is offset from said optical axis of said composite lens by a distance of 2.79 mm.

4. In an optical system as claimed in claim 3 wherein the predetermined concavity of said hypotenuse face of said prism is defined by a longitudinal radius of curvature of 40,000 mm. and a transverse radius of curvature of 8,500 mm.

5. In an optical systems as claimed in claim 4 wherein the hypotenuse face of said prism has a length of 80.818 mm. and the opposing faces of said prism have a length of 57.15 mm.

References Cited in the file of this patent

UNITED STATES PATENTS

| | | |
|---|---|---|
| 467,291 | Abott | Jan. 19, 1892 |
| 1,098,905 | Humbrecht | July 2, 1914 |
| 1,520,245 | Humbrecht | Dec. 23, 1924 |
| 1,525,657 | Roach | Feb. 10, 1925 |
| 2,384,540 | Flint | Sept. 11, 1945 |
| 2,523,577 | Laverdue | Sept. 26, 1950 |

FOREIGN PATENTS

| | | |
|---|---|---|
| 15,188 | Great Britain | June 10, 1909 |
| 108,725 | Great Britain | Aug. 20, 1917 |
| 348,835 | Germany | Feb. 17, 1922 |
| 662,938 | Great Britain | Dec. 12, 1951 |
| 756,058 | Great Britain | Aug. 29, 1956 |